(12) United States Patent
Peterson

(10) Patent No.: US 6,371,004 B1
(45) Date of Patent: Apr. 16, 2002

(54) LASER BEAM APPARATUS FOR ADJUSTING TELESCOPIC GUN SIGHTS

(75) Inventor: Thomas K. M. Peterson, Courtland, MN (US)

(73) Assignee: Stoney Point Products, Inc., New Ulm, MN (US)

( * ) Notice: Subject to any disclaimer, the term of this patent is extended or adjusted under 35 U.S.C. 154(b) by 0 days.

(21) Appl. No.: 09/373,297

(22) Filed: Aug. 12, 1999

(51) Int. Cl.[7] .............................. F41G 1/34; F41G 3/00; G01B 11/26; F41A 5/00
(52) U.S. Cl. ........................ 89/145; 33/234; 356/153; 42/103
(58) Field of Search ..................... 33/227, 228, 233, 33/234, 235, 282, 284, 286, DIG. 21; 356/137, 153, 154; 359/286; 42/103; 89/145, 132

(56) References Cited

U.S. PATENT DOCUMENTS

| | | | | |
|---|---|---|---|---|
| 2,797,485 A | * | 7/1957 | Lewis | 33/286 |
| 3,603,688 A | * | 9/1971 | Smith-Vaniz | 356/400 |
| 3,612,949 A | * | 10/1971 | Becraft et al. | 356/153 |
| 3,650,034 A | * | 3/1972 | Ruckle et al. | 33/275 R |
| 3,734,627 A | * | 5/1973 | Edwards | 356/153 |
| 4,530,162 A | * | 7/1985 | Forrest et al. | 33/228 |
| 4,676,636 A | * | 6/1987 | Bridges et al. | 356/153 |
| 4,825,258 A | * | 4/1989 | Whitson | 356/153 |
| 5,031,349 A | * | 7/1991 | Vogel | 42/103 |
| 5,040,885 A | * | 8/1991 | Simms | 359/399 |
| 5,232,598 A | * | 8/1993 | Thomas et al. | 210/500.25 |
| 5,233,124 A | * | 8/1993 | Peterson | 86/1.1 |
| 5,410,815 A | * | 5/1995 | Parikh et al. | 33/234 |
| 5,432,598 A | * | 7/1995 | Szatkowski | 356/153 |
| 5,438,404 A | * | 8/1995 | Hamilton et al. | 356/152.2 |
| 5,446,535 A | * | 8/1995 | Williams | 356/153 |
| 5,454,168 A | * | 10/1995 | Langner | 33/234 |
| 5,878,504 A | * | 3/1999 | Harms | 33/247 |

FOREIGN PATENT DOCUMENTS

GB      2275543     *   8/1994

OTHER PUBLICATIONS

Derwent abstract 1993—256647 of SU 1753262, published Aug. 7, 1992.*
Derwant abstract 1993—217991 of SU 1744044, published Jun. 30, 1992.*
Derwant abstract 1984—048465 of SU 1015247, published Apr. 30, 1983.*

* cited by examiner

*Primary Examiner*—Diego Gutierrez
*Assistant Examiner*—Maria Fernandez
(74) *Attorney, Agent, or Firm*—Haugen Law Firm PLLP

(57) ABSTRACT

A bore sighting assembly for accurately mounting a telescopic sight on a rifle or other firearm, with the sighting assembly utilizing a laser beam generator for creating a beam having a diameter of less than that of the bore, and with the light being directed axially through the bore onto a remote target. In addition to the laser generator, the bore sighting assembly includes a guide for controllably directing the beam from the generator through and along the axis of the bore for impingement onto a remote target. The guide includes eccentric bushings for adjustably positioning the laser generator in the receiver area of the rifle or firearm, and a beam control disc may be secured to the distal tip of the barrel for additional guidance and control of the laser beam.

10 Claims, 3 Drawing Sheets

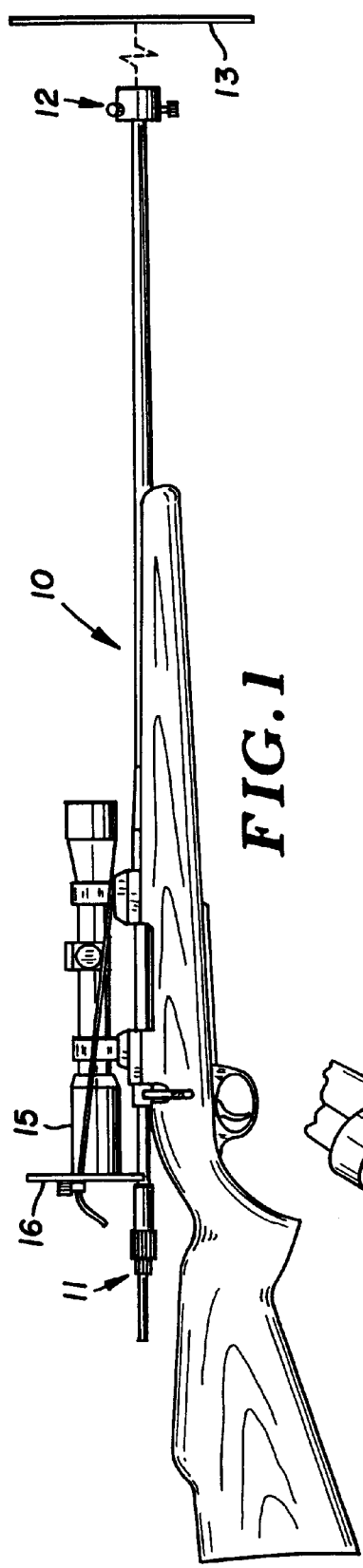
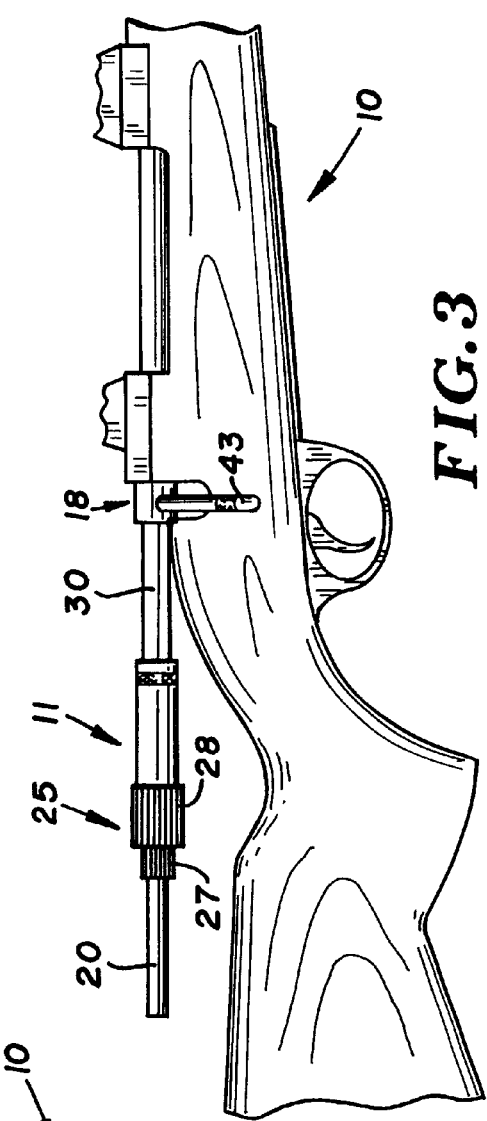
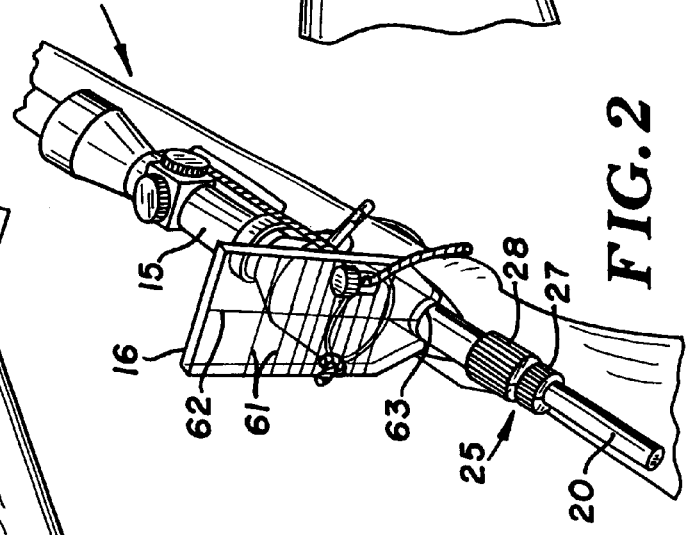

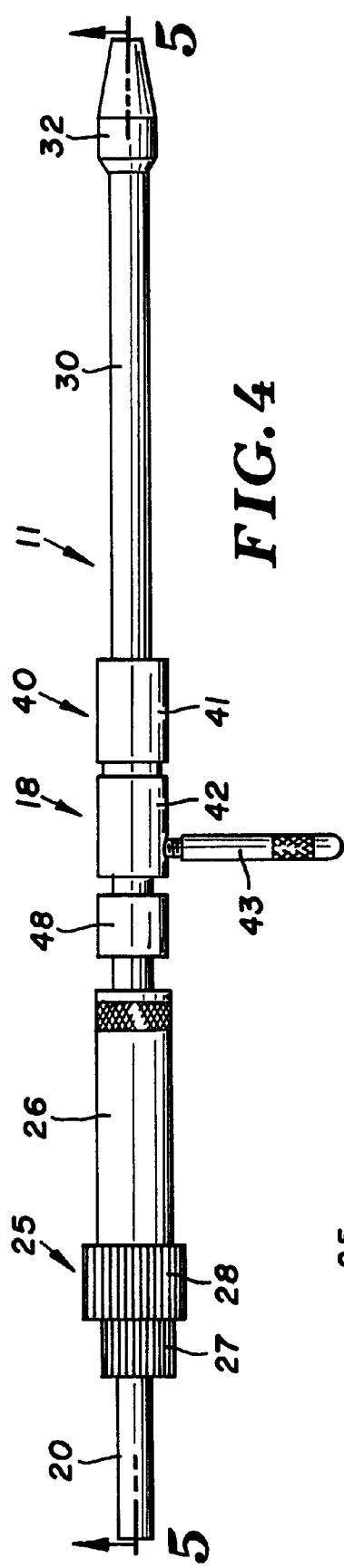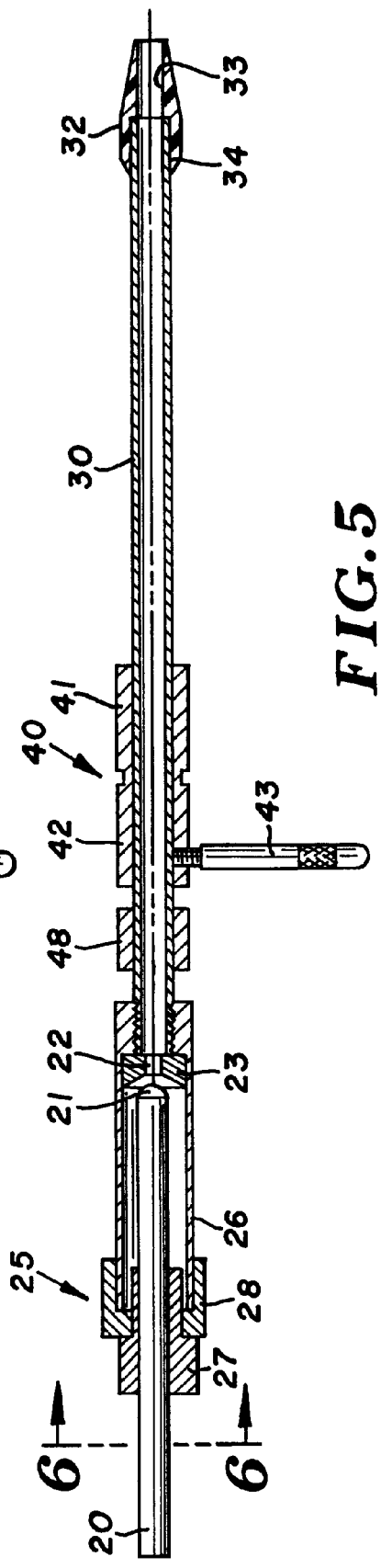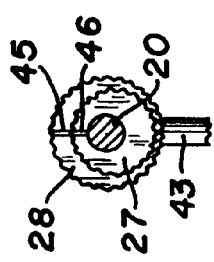

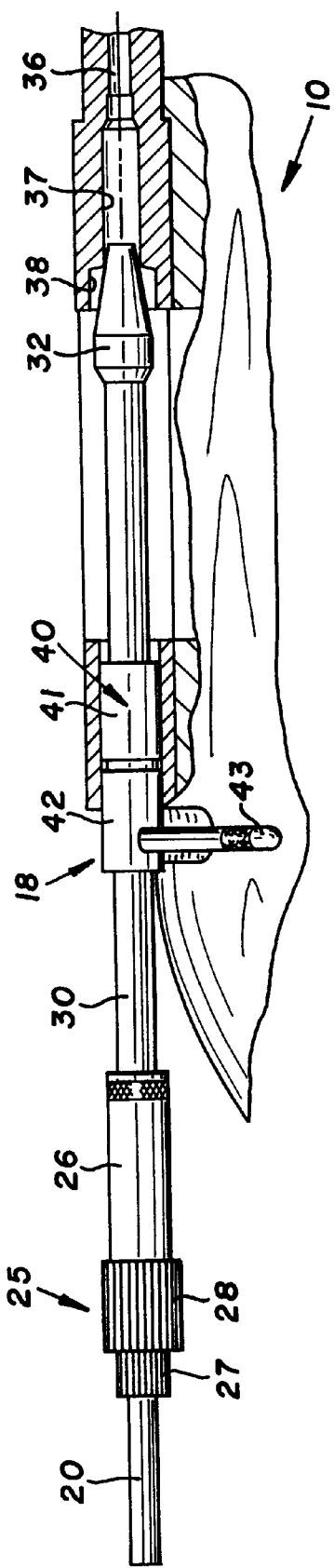
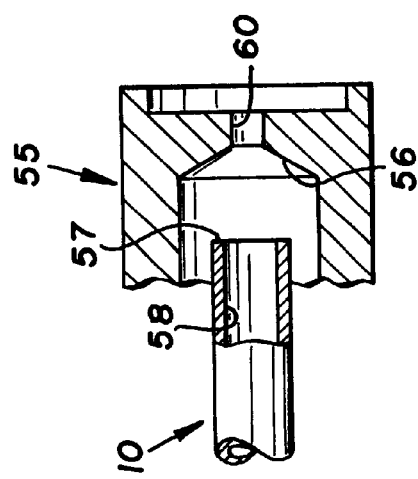
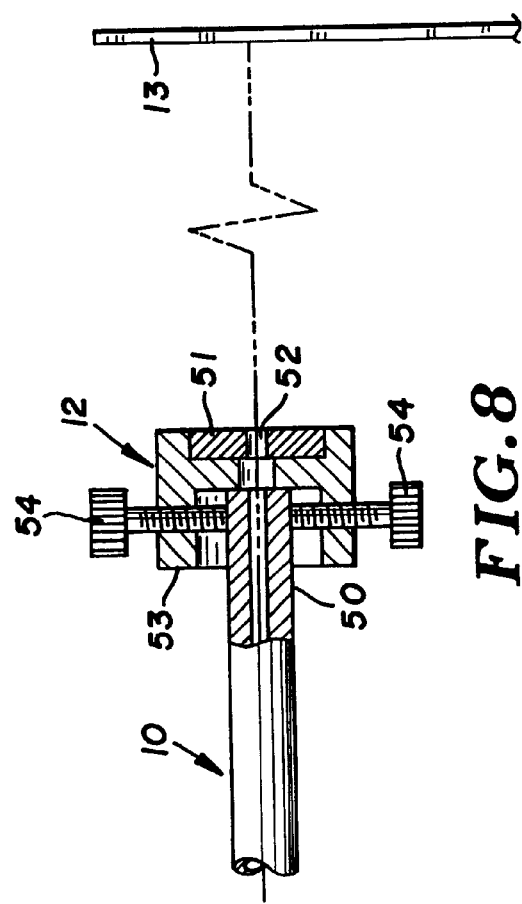
FIG.7
FIG.9
FIG.8

LASER BEAM APPARATUS FOR ADJUSTING TELESCOPIC GUN SIGHTS

CROSS-REFERENCE TO RELATED APPLICATION

This application is based upon Disclosure Document No. 453,644, filed Mar. 26, 1999 of Tom Peterson, entitled "THE LASER BORE SIGHT ALIGNMENT AID".

BACKGROUND OF THE INVENTION

The present invention relates generally to an improved bore sighting assembly for accurately positionably mounting an optical sight such as a telescopic sight on a firearm, with the sighting assembly employing a laser beam generator for passing a coherent beam of light through the bore of the firearm and onto the surface of a remotely positioned target. The point on the target upon which the coherent beam impinges represents a direct projection of the bore of the firearm, and hence a theoretical point of impact without regarding gravitational and other external forces. By adjusting the reticles on the telescopic sight relative to the theoretical point of impact, and by determining the ballistic characteristics of the ammunition to be employed, the telescopic sight may be "zeroed-in" for the actual point of impact for the firearm at any desired range. The bore sighting assembly of the present invention has been found to be exceptionally accurate, and thus sportsmen, competitive shooters, and the like are able to adjust the firearm sight in advance of entering the field where ultimate final adjustments and "zeroing" may be undertaken.

In the past, various techniques have been employed for bore-sighting firearms, in particular, rifles. This is particularly necessary when the rifle is being fitted with telescopic sights. Bore sighting has proven to be a somewhat inexact science, since the gunsmith or technician may create errors due to the nature of limitations inherent in conventional bore sighting techniques and devices. The availability of some types of radiant energy, particularly in the form of visible light has provided some advancements in the ease and accuracy of bore sighting, however most currently known techniques have significant limitations and have not proven to be either expedient or substantially reliable.

The features of the present invention overcome prior limitations in that the improved bore sighting assembly makes it possible to accurately position a laser generator within any of a wide variety of firearms, with the generator being centered within an assembly in actual physical contact with the breech and bore of a rifle. Thus, the beam of coherent light is able to pass throughout the entire length of the barrel without impingement on the bore surface, and onto a remotely positioned target. By lining up the sight with the remote projection of the barrel bore, the positioning of the sight may be predetermined with significant accuracy.

SUMMARY OF THE INVENTION

The bore sighting assembly of the present invention is designed to be compatible with conventional laser generators which are battery powered, inexpensive, and widely commercially available. By carefully positioning such a laser source within the bore sighting assembly of the present invention, accurate telescopic sight mounting is made possible.

In accordance with the present invention, the firearm bore sighting assembly employs a laser generator for creating a coherent beam of monochromatic light energy with the beam passing through the barrel having a diameter less than that of the firearm bore. The firearm bore sighting assembly employs a source of coherent monochromatic light, commonly known as a laser generator, with the coherent beam of monochromatic light having and maintaining its certain predetermined narrow beam diameter. Beam directing or guide means are provided for mounting the generator in an assembly wherein the beam is centered within and passes directly through the firearm bore without interference due to impinging on the wall of the bore. The beam directing means is also adjustable for retaining the generator in a proper radial disposition, and in order to further control the beam diameter, a beam transmitting orifice formed within a disc is placed along the beam path. After passing through the orifice, the coherent beam is then passed through the firearm bore.

The beam directing means further includes an elongated tubular beam guide which is configured to be adjustably and firmly positioned within the firearm receiver. A frusto conical orienting tip is provided at the distal end of the tube, with the frusto conical tip having a central light beam transmitting bore through which the beam travels for centering the beam. The size of the frusto conical tip is controlled to accurately position the actual tip centrally within the firearm bore. As a further feature, the body of the frusto conical tip is formed of a translucent material, and deflection of the coherent beam from a true axial direction will cause the edge portion of the coherent beam to strike the frusto conical tip, and thereby illuminate the entire tip indicating to the technician that the position of the generator must be further adjusted. Upon adjustment of the light beam within the beam guide, the path of the beam may be corrected so as to avoid contact with any portion of the frusto conical tip. When properly adjusted, and when the beam does not strike any portion of the tip, the translucent characteristic of the tip will verify this condition by simply ceasing to glow with the characteristic color of the beam.

As a further feature of the present invention, a range aid is provided which is adapted to be coupled to the eyepiece of the telescopic sight, with the range aid including horizontally disposed lines which, taken together with ballistic characteristics of the ammunition being used, can aid in accurately positioning the sight for zeroing at a predetermined range. This is all accomplished by means of the same remotely positioned target. The remote target is preferably positioned a distance of approximately 25 yards from the muzzle of the firearm, although any desired distance in excess of about 20 yards is usable.

A further feature of the invention includes the utilization of a muzzle adaptor which permits the device to be employed on firearms with larger bores, including shotguns as well as certain rifles of large bores.

Therefore, it is a primary object of the present invention to provide an improved bore sighting assembly for assistance in accurately positionably mounting an optical or telescopic sight on a firearm, particularly on rifles.

It is a further object of the present invention to provide an improved bore sighting assembly which employs a source of laser energy for passage of a beam of coherent light unimpeded through a firearm bore, and onto a remote target, where the optical sight may be used to observe the illuminated spot in order to mount the scope based upon the point at which the coherent light energy strikes the target.

It is yet a further object of the present invention to provide an improved bore sighting assembly for accurately and positionably mounting a telescopic sight on a firearm, wherein means are provided for accurately positioning a laser generator within the receiver area of a rifle, and wherein the coherent light energy created by the generator is passed through the barrel bore and onto a remotely positioned target where the reticle portions of the telescopic sight may be positionably directed for viewing the point of projection for accurate mounting of the telescopic sight.

Other and further objects of the present invention will become apparent to those skilled in the art upon a study of the following specification, appended claims, and accompanying drawings.

IN THE DRAWINGS

FIG. 1 is a side elevational view of a conventional scope-mounted bolt action rifle in which the bore sighting assembly of the present invention is mounted;

FIG. 2 is a fragmentary perspective view showing the top and side portions of the rifle of FIG. 1, with portions of the rifle being cut-away, and with FIG. 2 being shown on a slightly enlarged scale;

FIG. 3 is a fragmentary side elevational view of the system illustrated in FIG. 1, with portions of the rifle including the telescopic sight being cut-away, and with the bore sighting assembly of the present invention being shown mounted within the rifle;

FIG. 4 is a side elevational view on a slightly enlarged scale, illustrating the bore sighting assembly of the present invention;

FIG. 5 is a sectional view taken along the line and in the direction of the arrows 5—5 of FIG. 4, and generally taken through the diameter of the bore sighting assembly;

FIG. 6 is a detail front elevational view taken along the line and in the direction of the arrows 6—6 of FIG. 5, and illustrating the eccentric mounting rings for use in centering the laser generator in the bore sighting assembly of the present invention;

FIG. 7 is a fragmentary sectional view showing a side elevational view of the apparatus as illustrated in FIG. 4, but on a slightly reduced scale, and illustrating fragmentary portions of a rifle receiver into which the bore sighting assembly is received;

FIG. 8 is a fragmentary side elevational view, partially in section, of the muzzle of a rifle barrel with an aperture disc attached; and FIG. 9 is a detail fragmentary sectional view of an aperture disc which may be employed for attachment directly to the muzzle of the firearm, and particularly adapted for use with firearms of larger bores, including shotguns and certain large-bore rifles.

DESCRIPTION OF THE PREFERRED EMBODIMENT

In accordance with the preferred embodiment of the present invention, and with particular attention being directed to FIGS. 1–3 of the drawings, the scope-mounted bolt action rifle generally designated 10 is shown fitted with the bore sighting assembly of the present invention generally designated 11, with the sighting assembly 11 positionably mounted within the receiver portion of the rifle 10. Additionally, a muzzle adaptor assembly as shown generally at 12 with the assembly 12 including an aperture disc as will be more fully described hereinafter. Target 13 is shown remote from the assembly 10, 11 and 12, and is, as indicated, in line with the laser light beam which is directed into and through the extent of the firearm bore of rifle 10. In order to secure sighting assembly 11 for retention in a desired and required location within the rifle 10, mounting means as shown at 18 are provided for locking engagement of bore sighting assembly 11 within the rifle 10. Scope 15 is fitted with a graduated clear acrylic range aid as at 16 for a purpose to be hereinafter discussed.

With attention now being directed to FIG. 4 of the drawings, bore sighting assembly 11, as shown, comprises a source of coherent monochromatic light in the form of laser beam generator 20. As illustrated in FIG. 5, lens 21 of generator 20 is disposed within assembly 11, the coherent beam created by laser 20 is caused to pass through orifice 22 of beam diameter control disc 23. Holder means generally designated 25 are provided for positionably and adjustably retaining laser generator 20 within housing 26. As shown in FIG. 6, the holder means 25 comprises inner and outer eccentric rings 27 and 28, with these eccentric rings each being rotatable relative to the body of laser generator 20 so as to accurately position the generator within the sighting assembly, and specifically within housing 26. By properly and accurately radially positioning generator 20 within housing 26, the beam passing through lens 21 is caused to pass through the orifice 22 of beam diameter control 23, and thence into the proximal end of the elongated tubular beam guide comprising tubular body 30. Coherent light beam entering tube 30 through orifice 22 exits through frusto conical breech engaging centering means as at 32. The body of the bore centering frusto conical member is comprised of a translucent material such as nylon or Teflon® which are tough, durable, engineered plastic materials. Frusto conical member 32, as illustrated, has an axial bore 33 through which the beam passes, as well as counterbore 34 into which the distal tip of tube 30 is firmly and tightly received and fitted. As shown, it will be appreciated that the diameter of the axial bore 33 at the outer end of member 32 is greater than the beam diameter. This provides a feature wherein any impingement of the coherent beam upon the outer surfae of bore 33 will cause the entire translucent body of frusto conical member 32 to glow as a visual indication of axial misalignment. By appropriately positioning laser generator 20 within eccentrics comprising the centering mechanism 25, the coherent beam will be appropriately directed through the entire assembly, including translucent tip 32, for ultimate transmission through the bore of the firearm. Also, as indicated in FIG. 7, of the drawings, the outer diameter of frusto conical member 32 is sufficiently small at its distal tip so as to pass through the breech area with portions being disposed axially within the firearm bore. The bore of firearm 10 is shown at 36, with the chamber into which member 32 extends being shown at 37. Furthermore, breech zone is shown at 38 (FIG. 7).

An adaptor sleeve means is shown generally at 40, with the sleeve including a body comprising the receiver adaptor 41 and a locking segment as at 42. Locking segment 42 is equipped with a locking pin as shown at 43 which is threadably coupled to segment 42 for locking engagement with the outer surface of tube 30. This feature is illustrated in detail in FIG. 5.

As a further feature of this portion of the assembly, the adaptor sleeve 40 is slidable upon the outer surface of tube 30. This feature permits adaptor sleeve 40 to move axially along the surface of tube 30 so as to appropriately center frusto conical tip 32 within chamber 37 of firearm bore 36. As a still further feature, locking pin 43 is arranged to engage the arcuately extending bolt accommodating slot formed in bolt action rifles of the type illustrated in FIGS. 1–3. Thus, by appropriately positioning adaptor 40 onto sleeve 30, the locking pin 43 would be utilized to hold frusto conical body 32 within chamber 37 of bore 36.

Accordingly, the arrangement is such that a coherent beam of light energy such as from a laser generator is caused to pass through the entire length of the bore of a firearm, and onto a remote target where it may be visually compared and related to the reticle portions of a telescopic sight mounted upon the firearm.

With particular attention being directed to FIG. 6 of the drawings, it will be observed that eccentric bushings 27 and 28 are provided with indicia thereon for designating or indicating the arcuate position of the eccentrics. Furthermore, these indicia or index markings are shown at 45 and 46, and when placed in alignment, the eccentric offsets are equalized or canceled-out. This feature permits accurate radial positioning of generator 20 in the housing 26.

With attention now being directed to FIG. 4 of the drawings, an auxiliary slide guide as at 48 is provided as a means of preventing run-out of tube 30 relative to the remaining components. In this connection, slidable sleeve or bushing 48 has the same outer diameter as that of each of adaptor segments 41 and 42, as well as that of housing 26. Therefore, all receiver diameters may be accommodated by substitution of components, including adaptor sleeve 40, slide sleeve 48, and optionally housing 26.

With attention now being directed to FIGS. 8 and 9 of the drawings, it will be observed that aperture disc generally designated 12 is coupled to the muzzle area 50 of rifle 10. Aperture disc 12 comprises a disc member 51 with a central aperture or light beam transmitting bore as at 52, with the entire assembly being held within housing 53 and held onto the barrel of rifle 10 from actuated set screws 54—54. For proper alignment, at least three such thumb screws are advisable.

With attention being directed to FIG. 9 of the drawings, an interior cut-away view of an alternative form of aperture disc is illustrated. In this arrangement, aperture disc assembly 55 comprises a body member with a tapered cone area as at 56 for contact with tip portion 57 of the barrel of firearm 10. The bore of firearm as illustrated in FIG. 9, such as at 58, may be sufficiently large so as to render it appropriate to more accurately center the beam within orifice 60 of aperture disc 55.

With attention being further directed to FIG. 2, it will be noted that a graduated acrylic range aid 16 is provided with a plurality of horizontal indicia as at 61—61. In this connection, the vertical reticle of scope 15 may be held in alignment with the vertical line 62, and thereby aid in providing suitable elevation for the rifle and its intended ammunition. Ballistic characteristics of specific loads are, of course, widely published and available, and these characteristics are used in order to appropriately calibrate the telescopic sight with respect to elevation. As indicated at 63, the lower edge surface of the range aid is provided with a generally semi-circular cutout having a radius which matches the outer radius of the tubular body 30.

It will be appreciated that the examples given herein are for purposes of illustration only and are not to be construed as a limitation upon the scope and coverage to which the present invention is reasonably entitled.

What is claimed is:

1. In combination with a firearm with a receiver and a barrel having a firearm bore with a breech at one end and a muzzle at the opposed end, a bore sighting assembly for accurately positionably mounting an optical sight on said firearm, the sighting assembly directing a coherent beam of monochromatic light axially through the firearm bore and onto a remote target, said bore sighting assembly comprising:

(a) a source of coherent monochromatic light including a beam generator for controllably creating said coherent beam of monochromatic light having a certain predetermined beam diameter, wherein said firearm bore has a diameter which is greater than said predetermined beam diameter;

(b) beam directing means for directing said coherent light beam from said generator into the firearm bore of a firearm for transmission directly through said firearm bore and free of beam impingement on an interior wall of said firearm bore; said beam directing means comprising:

(1) positionably adjustable holder means for adjustably retaining said beam generator and for establishing the radial disposition of said generator within said beam directing means;

(2) beam diameter control means disposed in the path of said coherent light beam and having a beam transmitting orifice formed therein for establishing said predetermined beam diameter of said coherent beam;

(3) elongated tubular beam guide means for receiving said coherent light beam from said beam diameter control means and having a beam receiving port adjacent said beam transmitting orifice at the proximal end thereof and a frusto conical firearm bore centering means engaging said breech of said firearm bore at the distal end thereof, the body of said bore centering means comprising a body of translucent material and having an axial beam transmitting bore at the outer end thereof with a diameter which exceeds the said predetermined beam diameter and a counterbore at the opposed end for receiving the outer periphery of the distal tip of said elongated tubular guide means therewithin;

(4) firearm receiver adaptor sleeve means disposed in annular disposition about the outer periphery of said beam guide means and being configured to be received within a receiver of the firearm and with radially extending tube locking means being coupled to said adaptor sleeve means for engagement with a wall of said receiver and for lockably positioning said tubular beam guide means at a predetermined axial disposition within said receiver;

(c) the arrangement being such that said coherent beam passes from said beam generator through said beam transmitting orifice, said elongated tubular beam guide means and a breech engaging firearm bore centering means for direct transmission of said coherent monochromatic light beam through the firearm bore and onto a remote target without impingement of said coherent beam on the surface of said bore.

2. The combination of claim 1 wherein said positionably adjustable holder means for said beam generator includes at least one eccentric bushing for adjustably positioning said beam generator relative to said beam transmitting orifice.

3. The combination of claim 2, wherein said positionably adjustable holder means for said beam generator includes an inner eccentric bushing in engagement with the outer surface of said beam generator, and with a second eccentric bushing disposed radially outwardly of said first bushing, and with said first and second eccentric bushings arranged in cooperative relationship, one with the other for adjustably radially positioning said beam generator relative to said elongated tubular beam guide means and said beam transmitting orifice.

4. The combination as defined in claim 1, being particularly characterized in that the proximal end of said elongated tubular beam guide means is coupled to a housing retaining said beam generator, with the forward end of said housing having a bore formed therein for engaging the outer periphery of said tubular beam guide means, and with the proximal end having a counterbore therein for receiving said beam generator.

5. The combination of claim 4, being characterized in that the outer end of said frusto conical breech engaging centering means has an outer diameter for accommodating insertion of said frusto conical breech engaging centering means axially through said breech into the firearm bore.

6. The combination of claim 1, being particularly characterized in that the outer tip portion of said bore centering means enters said bore through the breech, and the outer periphery of said bore centering means is in contact with the surface of said firearm barrel delineating said bore at the breech thereof.

7. The combination of claim 1 further comprising an aperture disc means adapted to be releasably coupled to the distal end of the barrel, said aperture disc means having a central aperture with a diameter less than that of said bore.

8. The combination of claim 7, wherein said aperture disc comprises a translucent plastic.

9. The combination of claim 1 further comprising a range aid means for releasable attachment to said bore sighting assembly and for alignment of an eyepiece of an optical sight on said firearm, said range aid means comprising a body of transparent material having a vertical reference line and a plurality of horizontal score lines formed thereon, wherein a suitable elevation point of impact may be ascertained.

10. The combination of claim 9, wherein said range aid means comprises a rectangular body having a cutout portion on the base thereof and being of generally semi-circular configuration, wherein the cutout has a radius matching the outer radius of said tubular body.

* * * * *